US008425377B2

(12) United States Patent
Liang et al.

(10) Patent No.: US 8,425,377 B2
(45) Date of Patent: Apr. 23, 2013

(54) MULTIPLE-MODE POWER SPLIT HYBRID POWERTRAIN

(75) Inventors: Wei Liang, Farmington Hills, MI (US); Xiaoyong Wang, Canton, MI (US); Wei Wu, Canton, MI (US); Ryan Abraham McGee, Ann Arbor, MI (US); Ming Lang Kuang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 429 days.

(21) Appl. No.: 12/767,841

(22) Filed: Apr. 27, 2010

(65) Prior Publication Data

US 2011/0263379 A1 Oct. 27, 2011

(51) Int. Cl.
*F16H 3/72* (2006.01)
*F16H 37/06* (2006.01)
*H02P 17/00* (2006.01)
*B60K 6/445* (2007.10)

(52) U.S. Cl.
USPC ............. 477/5; 477/6; 477/8; 477/15; 475/4; 475/5; 180/65.235; 180/65.265

(58) Field of Classification Search .................. 477/4–6, 477/8, 9, 15; 180/65.235, 65.265, 65.6, 65.7; 475/1–10
See application file for complete search history.

(56) References Cited

U.S. PATENT DOCUMENTS

| | | | |
|---|---|---|---|
| 3,623,568 A * | 11/1971 | Mori .............................. | 180/15 |
| 6,575,866 B2 | 6/2003 | Bowen | |
| 6,581,706 B2 * | 6/2003 | Bordini .................... | 180/65.235 |
| 6,702,709 B2 | 3/2004 | Bowen | |
| 6,716,126 B2 | 4/2004 | Bowen | |
| 6,793,034 B2 | 9/2004 | Raftari et al. | |
| 6,887,180 B2 | 5/2005 | Pels et al. | |
| 6,991,053 B2 | 1/2006 | Kuang et al. | |
| 6,994,360 B2 | 2/2006 | Kuang et al. | |
| 7,083,545 B2 | 8/2006 | Ibamoto et al. | |
| 7,117,964 B1 | 10/2006 | Kuang et al. | |
| 7,128,675 B2 | 10/2006 | Klemen et al. | |
| 7,128,677 B2 * | 10/2006 | Supina et al. ..................... | 475/5 |
| 7,249,537 B2 | 7/2007 | Lee et al. | |
| 7,272,987 B2 | 9/2007 | Hughes | |
| 7,273,439 B2 | 9/2007 | Kuang et al. | |
| 7,276,008 B2 | 10/2007 | Yasui et al. | |
| 7,285,869 B2 | 10/2007 | Syed et al. | |
| 7,462,121 B2 | 12/2008 | Janson et al. | |
| 7,481,733 B2 | 1/2009 | Cho et al. | |
| 2007/0225099 A1 | 9/2007 | Cho et al. | |

(Continued)

FOREIGN PATENT DOCUMENTS

JP 2004182034 A * 7/2004

*Primary Examiner* — Tisha Lewis
(74) *Attorney, Agent, or Firm* — James Dottavio; Brooks Kushman P.C.

(57) ABSTRACT

A hybrid electric vehicle powertrain having a mechanical power source and an electro-mechanical power source, including a generator, a motor and a battery. Driving torque developed by the mechanical power source is delivered through one clutch of a geared transmission to a power output shaft. The electric motor of the electro-mechanical power source delivers driving torque through a second clutch of the geared transmission. A mechanical reverse drive torque is used to improve reverse drive performance. A reduction in duration of operation in a negative power split during a driving event is achieved to improve vehicle powertrain efficiency. A series drive is available as the mechanical power source drives the generator to charge the battery, which drives the motor. The generator may act as an engine starter motor.

14 Claims, 7 Drawing Sheets

U.S. PATENT DOCUMENTS

| | | |
|---|---|---|
| 2007/0259748 A1 | 11/2007 | Forsyth |
| 2009/0005215 A1 | 1/2009 | Silveri et al. |
| 2009/0054201 A1 | 2/2009 | Winkelmann et al. |
| 2011/0300983 A1* | 12/2011 | Kurokawa .......................... 475/5 |
| 2012/0053011 A1* | 3/2012 | Onomura et al. ................. 477/3 |

* cited by examiner

*Fig. 2a* (PRIOR ART) — WHEELS (ELECTRIC ONLY)

*Fig. 2b* (PRIOR ART) — WHEELS (ENGINE ON, POSITIVE POWER SPLIT)

*Fig. 2c* (PRIOR ART) — WHEELS (ENGINE ON, NEGATIVE POWER SPLIT)

*Fig. 2d* (PRIOR ART) — WHEELS (ENGINE ON, GEN. BRAKE ON (PARALLEL MODE))

MULTIPLE-MODE POWER SPLIT HYBRID POWERTRAIN

BACKGROUND

One class of hybrid electric vehicle powertrains is commonly referred to as a power split powertrain that has two sources of power. The first source includes an internal combustion engine and a second source is a combination of an electric motor, a generator and a battery. The engine and the generator, together with a planetary gearset, a countershaft and a motor, establish a mechanical torque flow path and an electromechanical torque flow path to vehicle traction wheels. The battery is an energy storing device for the generator and the motor. Engine power is divided into two power flow paths at any generator speed and vehicle speed. Engine speed is controlled by the generator, which implies that the engine speed can be decoupled from the vehicle speed within the allowed speed range of the generator. This mode of operation is called positive power split when the generator is generating electrical power using mechanical power input from the engine.

Because of the mechanical properties of the planetary gearset, the generator can distribute power to the planetary gearset to drive the vehicle. This mode of operation is called "negative power split". The combination of a generator, a motor and a planetary gearset thus can be considered to have electrical continuously variable (e-CVT) transmission characteristics.

A generator brake can be activated so that engine output power is transmitted with a fixed gear ratio to the torque output side of the powertrain through a mechanical path only. The first power source can only effect forward propulsion of the vehicle since there is no reverse gear. The engine requires either generator control or application of a generator brake to transmit output power for forward drive.

When the second power source is active, the electric motor draws power from the battery and drives the vehicle independently of the engine for both forward drive and reverse drive. In addition, the generator can draw power from the battery and drive against a one way clutch on the engine power output shaft to propel the vehicle in a forward direction. This mode of operation is called "generator drive mode". A vehicle system controller coordinates the two power sources so that they work together seamlessly to meet a driver's torque demand without exceeding powertrain system limits. The vehicle system controller allows continuous regulation of engine speed for any given vehicle speed and power request. The mechanical power flow path provides efficient power delivery through the planetary gearset to the driveshaft.

A power split hybrid electric powertrain has disadvantages when it is operated in a negative power split mode. For example, a negative power split establishes a power circulation path within the transmission itself as power is delivered to the traction wheels. This power circulation reduces powertrain efficiency due to the extra power loss generated during power circulation. A negative power split is needed, however, in a power split system in order to regulate engine speed at high vehicle speeds and at a low power demand. This operating condition happens mainly during operation on a highway at high speeds.

A second disadvantage of operating in a negative power split mode is apparent also during reverse drive. A power split powertrain of known design has low torque capacity in reverse drive. Since the planetary gearset cannot provide negative torque output in reverse drive, the motor must be used to balance ring gear torque at the planetary gearset. This limits the reverse drive torque capacity. Further, the generator must be sized large enough so that it is capable of holding engine torque for heavy vehicle applications.

SUMMARY

The invention comprises a hybrid powertrain design that avoids the drawbacks of a conventional power split hybrid vehicle powertrain described in the preceding discussion. It has the characteristics of both a power split hybrid electric powertrain and a power shift geared transmission. The transmission has two automated clutches between the ring gear of the planetary gearset and the power shift transmission. Two driving modes, low range and high range, have electro-mechanical e-CVT characteristics that are available for normal driving.

A mechanical reverse gear also is available, which avoids the need for relying only upon driving torque from the motor of the power split portion of the powertrain. Further, a ring gear locking state is included to effect a series operating mode in which power is transferred from the engine to the generator to the motor. The locking of the ring gear also makes it possible to use the generator as a motor to crank the engine during an engine start as the ring acts as a cranking torque reaction element.

DETAILED DESCRIPTION

Figure 1:
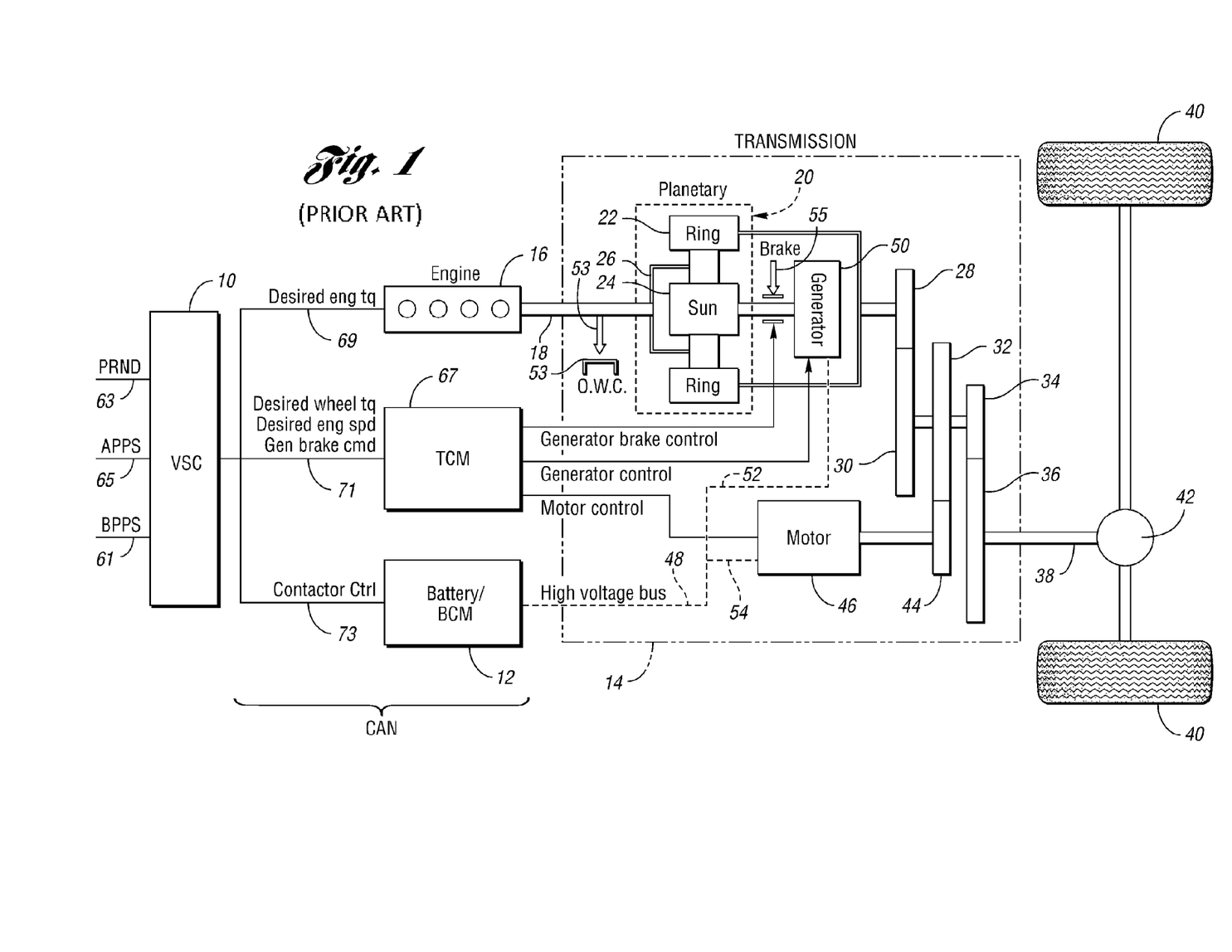
FIG. 1 is a schematic illustration of a power split hybrid electric vehicle powertrain of known design.

The disclosed hybrid electric vehicle powertrain has a parallel-series configuration, as shown in FIG. 1. A vehicle system controller 10, a battery 12 and a transaxle 14, together with a motor-generator subsystem, are under control of a control area network (CAN). An engine 16, controlled by module 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34 and 36. A torque output shaft 38 for the transaxle is drivably connected to vehicle traction wheels 40 through a differential and axle mechanism 42.

Gears 30, 32 and 34 are mounted on a countershaft, the gear 32 engaging a motor-driven gear 44. Electric motor 46 drives gear 44, which acts as a torque input for the countershaft gearing.

The battery delivers electric power to the motor through power flow path 48. Generator 50 is connected electrically to the battery and to the motor in known fashion, as shown at 52.

When the powertrain battery 12 is acting as a sole power source with the engine off, the torque input 18 and the carrier assembly are braked by an overrunning coupling 53. A mechanical brake 55 anchors the rotor of generator 50 and the sun gear 24 when the engine is on and the powertrain is in a parallel drive mode, the sun gear 24 acting as a reaction element.

As mentioned previously, there are two power sources for the driveline. The first power source is a combination of the engine and generator subsystems, which are connected together using the planetary gear unit 20. The other power source involves only the electric drive system including the motor, the generator and the battery, where the battery acts as an energy storage medium for the generator and the motor.

Figures 2, 3:
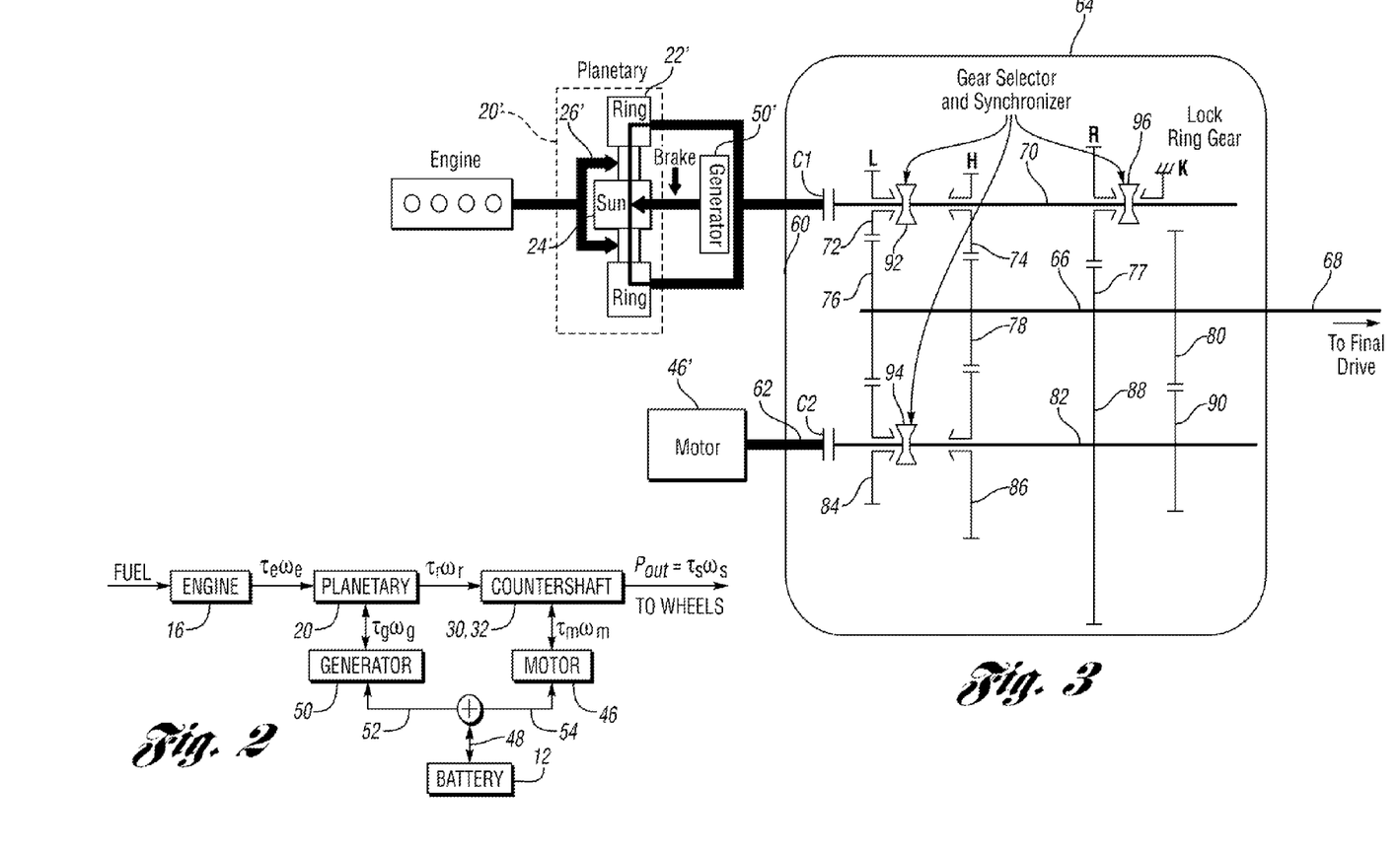
FIG. 2 is a schematic block diagram of the mechanical power flow paths and the electromechanical power flow paths for the powertrain of FIG. 1.
FIG. 3 is a schematic representation of the multiple-mode power split system incorporating the present invention.

The power flow paths between the various elements of the power split powertrain diagram shown in FIG. 1 is illustrated in FIG. 2. Fuel is delivered to the engine 16 under the control of the operator in known fashion using an engine throttle. Engine power delivered to the planetary gear unit 20 is expressed as $T_e \omega_e$, where $T_e$ is engine torque and $\omega_e$ is engine speed. Power delivered from the planetary ring gear to the countershaft gears is expressed as $T_r \omega_r$, which is the product of ring gear torque and ring gear speed. Power out from the transmission 14 is represented by the symbols $T_s$ and $\omega_s$, the torque of shaft 38 and the speed of shaft 38, respectively.

The generator, when it is acting as a motor, can deliver power to the planetary gearing. Alternatively, it can be driven by the planetary gearing, as represented in FIG. 2 by the torque flow path 52. Similarly, power distribution between the motor and the countershaft gears can be distributed in either direction, as shown by the torque flow path 54. Driving power from the battery or charging power to the battery is represented by the bi-directional arrow 48.

Figure 2A:
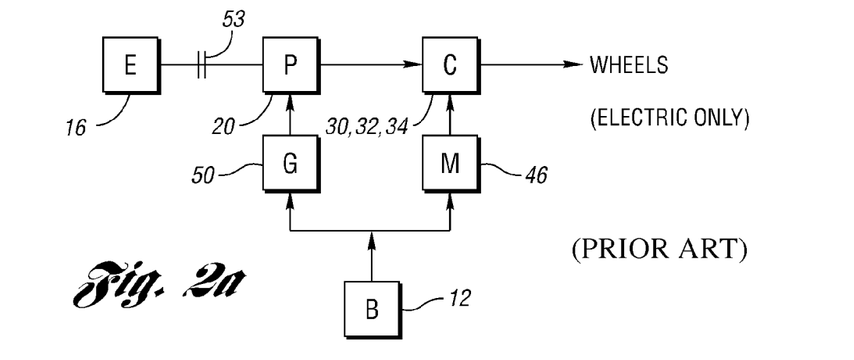
FIG. 2a is a diagram showing power flow between the elements of the powertrain of FIG. 1 during electric drive.
Figure 2B:
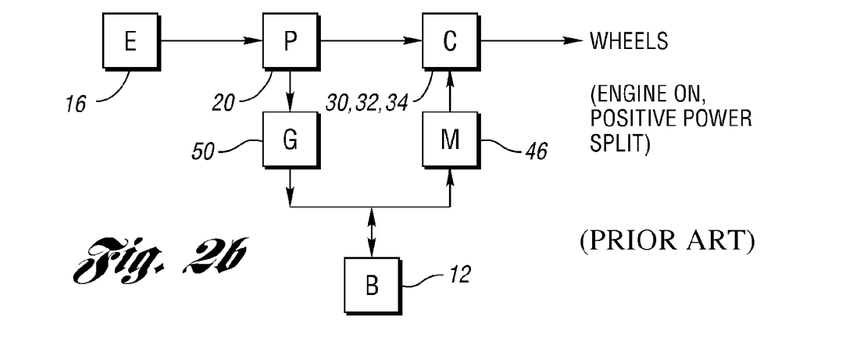
FIG. 2b is a diagram similar to the diagram of FIG. 2a when the powertrain of FIG. 1 is operating with the engine on in a positive power split mode.

As shown in FIG. 2, engine output power can be split into two paths by controlling the generator speed. The mechanical power flow path, $Tr\omega_r$, is from the engine to the carrier to the ring gear to the countershaft. The electrical power flow path is from the engine to the generator to the motor to the countershaft. The engine power is split, whereby the engine speed is disassociated from the vehicle speed during a so-called positive split mode of operation. This condition is illustrated in FIG. 2b, where the engine 16 delivers power to the planetary gearing 20, which delivers power to the countershaft gears 30, 32 and 34, which in turn drive the wheels. A portion of the planetary gearing power is distributed to the generator 50, which delivers charging power to the battery 12. The speed of the generator at that time is greater than zero or positive, and the generator torque is less than zero. The battery drives the motor 46, which distributes power to the countershaft. This arrangement is a "positive power split".

If the generator, due to the mechanical properties of the planetary gear unit, acts as a power input to the planetary gear unit to drive the vehicle, the operating mode can be referred to as a "negative power split". This condition is shown in FIG. 2c, where the generator speed is negative and the generator torque also is negative.

Figure 2C:
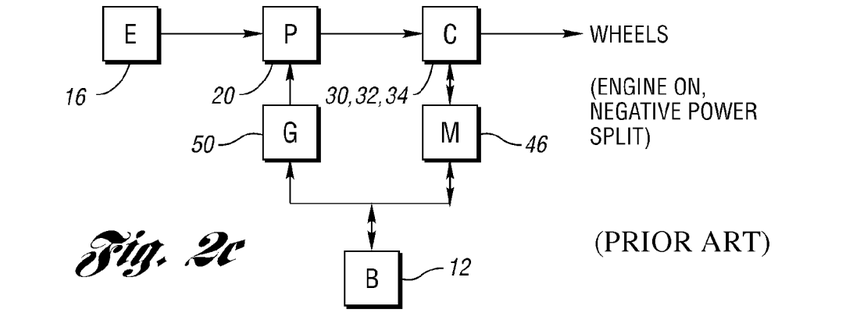
FIG. 2c is a diagram similar to the diagram of FIG. 2a showing the power flow when the engine is on and the powertrain of FIG. 1 is operating in a negative power split mode.

The generator in FIG. 2c delivers power to the planetary gear unit 20 as the motor 46 acts as a generator and the battery 12 is charging. It is possible, however, that under some conditions the motor may distribute power to the countershaft gearing if the resulting torque at the wheels from the gearing does not satisfy the driver demand. Then the motor must make up the difference.

Figure 2D:
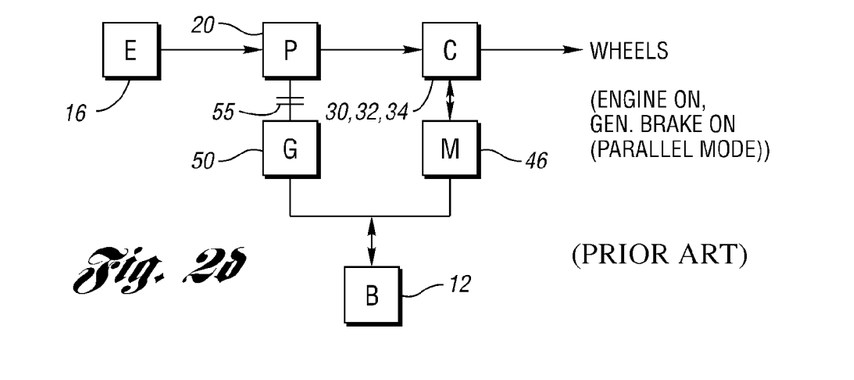
FIG. 2d is a power flow diagram similar to the diagram of FIG. 2a when the engine is on and the generator brake is on as the powertrain of FIG. 1 is operated in a parallel mode.

If the generator brake 55 is activated, a parallel operating mode is established. This is shown in FIG. 2d, where the engine 16 is on and the generator is braked. The battery 12 powers the motor 46, which powers the countershaft gearing simultaneously with delivery of power from the engine to the planetary gearing to the countershaft gearing.

The first source of power can deliver torque only for forward propulsion because there is no reverse gear in the countershaft gearing. The engine requires either generator control or a generator brake to permit transfer of power to the wheels for forward motion.

The second source of power, as previously described, is the battery, generator and motor subsystem. This is illustrated in FIG. 2a. In this driving mode, the engine is braked by the overrunning coupling 53. The electric motor draws power from the battery and effects propulsion independently of the engine, with either forward or reverse motion. The generator may draw power from the battery and drive against a reaction of the one-way coupling 53. The generator in this mode operates as a motor.

As previously indicated, the two power sources are integrated so that they seamlessly work together to meet the driver's demand for power without exceeding the system's power limits, including battery limits, while maintaining optimum powertrain efficiency and performance. The system will determine the driver's demand for torque and achieve the optimum split of power between the two power sources. If the battery limits are exceeded and the battery voltage is outside of a specified range, powertrain system shutdown may occur.

FIG. 3 shows a powertrain with the power split powertrain features of FIG. 1 in combination with a dual-clutch multiple-ratio, countershaft transmission. In FIG. 3, the elements of the split power portion of the powertrain are designated by numerals that are the same as the numerals used to describe the split power planetary portions of the known construction of FIG. 1, although numerals with prime notations are used. The ring gear 22' is connected drivably to the power input shaft 60 at the torque input side of clutch C1. Motor 46' drives power input shaft 62 at the torque input side of clutch C2. A countershaft gearing arrangement 64 includes a mainshaft 66, which is drivably connected to a final drive through power output shaft 68. A first countershaft 70 rotatably supports low range gear 72, high range gear 74 and reverse gear 71, a second countershaft 78, as well as reverse gear 76.

Mainshaft 66 is connected to gear 76, gear 78 and reverse gear 80. Low range gear 72 is meshed with gear 76 and high range gear 74 is meshed with gear 78.

A second countershaft 82 rotatably supports low range gear 84 and high range gear 86, which respectively engage gears 76 and 78. Countershaft gears 88 and 90, which are connected to countershaft 82, respectively engage reverse gear 76 and gear 80.

A synchronizer clutch, schematically shown at 92, connects selectively low range gear 72 and high range gear 74 to countershaft 70. Synchronizer clutch 94 selectively connects low range gear 84 and high range gear 86 to countershaft 82.

Clutch 96, when it is shifted in a left-hand direction, connects reverse gear 71 to countershaft 70. When it is shifted in a right-hand direction, countershaft 70 becomes locked to the transmission housing. This anchors ring gear 22'. This condition is indicated at K in FIG. 3. When the ring gear is locked, the powertrain achieves a series mode in which power is transferred from the engine and generator to the motor.

If the engine is off, it may be started by using generator torque as the brake at K locks ring gear 22'. The generator then acts as a motor as it provides cranking torque.

During operation in a power split mode at low vehicle speed, the transmission should work in the low range with the clutch 92 shifted in a left-hand direction. In this mode, both power flow paths from the ring gear to the shaft 68 and from the motor to the shaft 68 have high speed reduction and torque multiplication. During this operation in the low range mode, the generator speed is limited for a given vehicle speed and a given engine speed. The maximum generator torque will drop from a maximum value as the generator speed increases. This is illustrated at 140 in FIG. 8, which will be discussed subsequently.

During operation at low vehicle speeds in the low range (L), clutches 92 and 94 are shifted to the left so that motor torque is delivered to the mainshaft 66 with speed reduction and torque multiplication.

When clutches 92 and 94 are shifted to the right, high speed gear 74 and high speed gear 86 deliver torque from the ring gear and the motor, respectively, with a speed increase and a torque reduction. This allows generator speed to be positive most of the time to avoid operating in a negative split mode.

Reverse torque is delivered from countershaft 70 through clutch 96 when clutch 96 is shifted to the left. Reverse gear 76 then drives countershaft gear 88, which in turn delivers reverse torque to mainshaft 66 through countershaft gear 90 and main shaft gear 80.

Figure 3A:
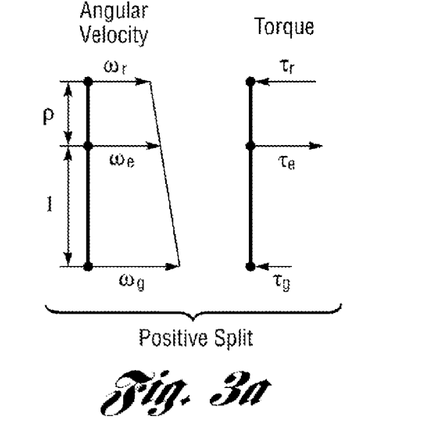
FIG. 3a is a vector diagram of speed and torque characteristics for the elements of the system of FIG. 3 during positive split drive.

A conventional power split hybrid electric vehicle powertrain of the type shown in FIG. 1 has velocity vectors for the elements of the powertrain as illustrated in FIGS. 3a, 3b, 3c, and 3d. FIG. 3a illustrates the so-called positive split mode in which the planetary gearset divides the power flow path from the engine into an electromechanical path and a mechanical path. In each of the FIGS. 3a-3d, the symbol $\omega_r$ is ring gear speed, the symbol $\omega_e$ is engine speed or carrier speed, and the symbol $\omega_g$ is generator speed. The corresponding vectors for torque are indicated by the symbols $\tau_r$ for ring gear torque, $\tau_e$ for engine or carrier torque, and $\tau_g$ for generator torque. The symbol $\rho$ indicates gear ratio.

Figure 3B:
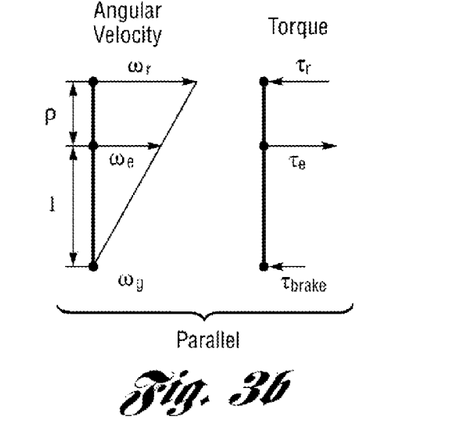
FIG. 3b shows vector diagrams for speed and torque for the elements of the system of FIG. 3 during parallel drive.

In the case of parallel operation, the generator is braked, so its velocity is zero. Its braking torque is indicated by the symbol $\tau_{brake}$.

Figure 3C:
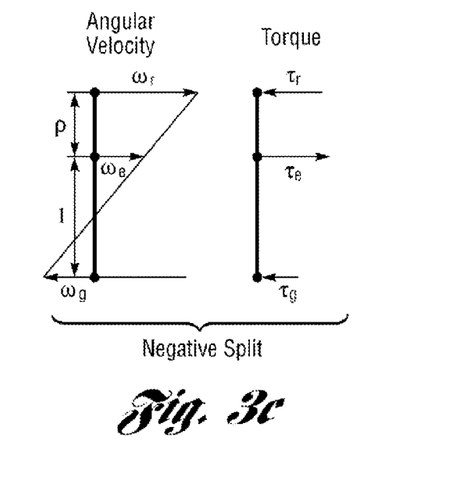
FIG. 3c shows vector diagrams for speed and torque for the elements of the system of FIG. 3 during negative split drive.
Figure 3D:
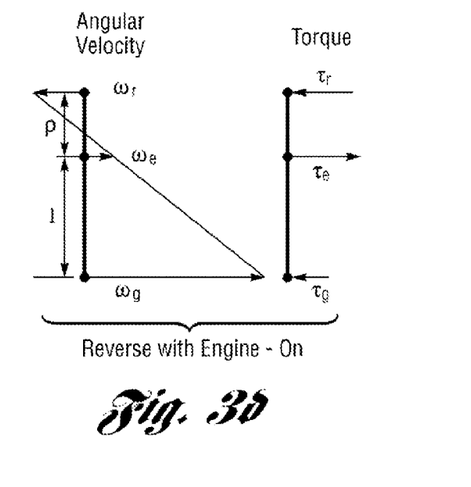
FIG. 3d shows the vector diagrams for speed and torque for the elements of the system of FIG. 3 during reverse drive.

In the vector diagrams of FIG. 3c for angular velocity and torque during a so-called negative split operation, the vector for generator speed is reversed and extends in a negative direction, which results in a reduction of engine speed. In the case of reverse drive operation, as indicated in FIG. 3d, the ring gear speed is reversed relative to the direction of ring gear speed during positive split drive, parallel drive and negative split drive. This results in a significant reduction in engine speed.

The power split system is operated in the parallel mode when the vehicle is traveling in a speed range in which the engine can be operated in its efficient region and when the battery does not need charging. In this mode, the generator brake may be applied and the sun gear is grounded thereby providing engine reaction torque. All the engine power then goes to the driven wheels. Since the sun gear is locked, the engine speed is proportional to the vehicle speed.

The power split system is operated in the positive split mode when the power produced by the engine is more than the driver's demand, or the vehicle speed is low. In the positive split mode, the generator is controlled to function as a generator to ensure that the engine is operated in the desired operating region for best efficiency. The generator applies torque in the direction of rotation of the engine to provide engine reaction torque. Consequently, the engine power output is split to meet the driver's demand and to drive the generator to charge the battery.

Figures 4, 5:
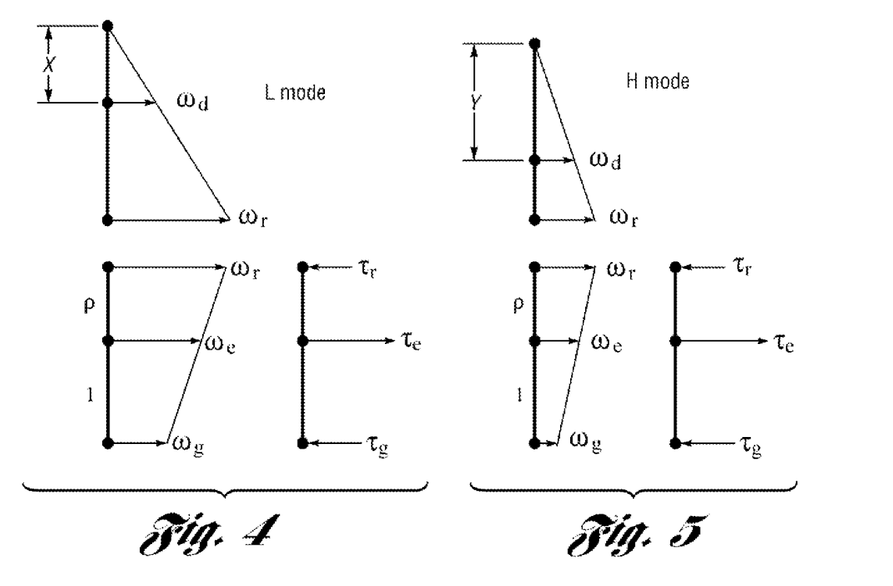
FIG. 4 shows vector diagrams for elements of the system of FIG. 3 when the powertrain is operated in a power split low range mode.
FIG. 5 shows vector diagrams for elements of the system of FIG. 3 during power split high range mode.

FIG. 4 is a vector diagram illustrating the speeds of the ring gear, the engine and the generator, as well as the corresponding values for ring gear torque, engine torque and generator torque when the powertrain is in the so-called low speed range. When the powertrain is operating in the so-called high speed range, the vectors for the speed and torque of the powertrain elements are indicated in FIG. 5. It should be noted that the ring gear speed, the engine speed and the generator speed shown in FIG. 5 are reduced relative to the corresponding speeds for low range operation indicated in FIG. 4. The speeds of the half-shafts (drive shafts), seen in FIG. 9 at 148 and 150, are shown in FIGS. 4 and 5 at $\omega_d$. The effective leverage provided by the differences in pitch diameters of the low range gears and the high range gears are apparent in FIGS. 4 and 5 by comparing dimensions "x" and "y", respectively. Dimension "x" is shorter than dimension "y".

Figure 8:
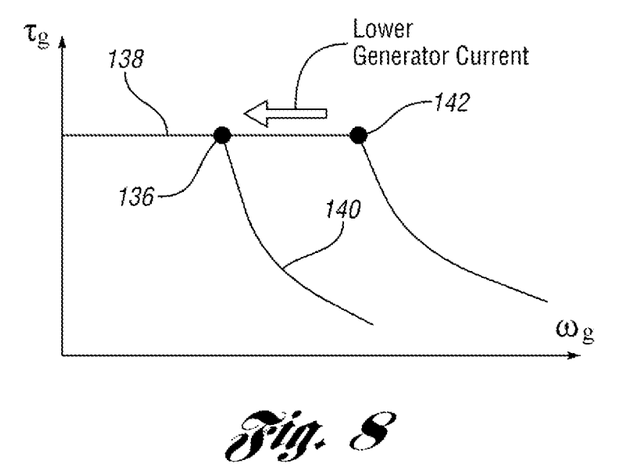
FIG. 8 is a plot of generator torque and generator speed characteristics for different generator current values.

During operation of the vehicle at low speeds, the transmission should work in the low range mode. In this mode both paths from the ring gear to the shaft 68 and from the motor to the shaft 68 have high speed reduction gear ratios. This allows torque multiplication for a given engine size and traction motor size. In addition, during low range operation, the generator speed is limited for a given vehicle and engine speed. Since the generator torque begins to drop from a maximum value when the generator speed increases, operation in low range will limit the generator speed to fully use its high torque range. The variation of generator maximum torque with increasing generator speed, as indicated earlier, is illustrated in FIG. 8.

During high speed operation, the transmission should be in the power split high operating mode. It has a low speed reduction gear ratio. This allows the generator speed to be positive during most of the operating time, thereby avoiding the negative split mode, which is inherently inefficient.

The design considerations that determine whether the powertrain should operate in the high range or the low range will be described with reference to FIG. 6.

Figure 6:
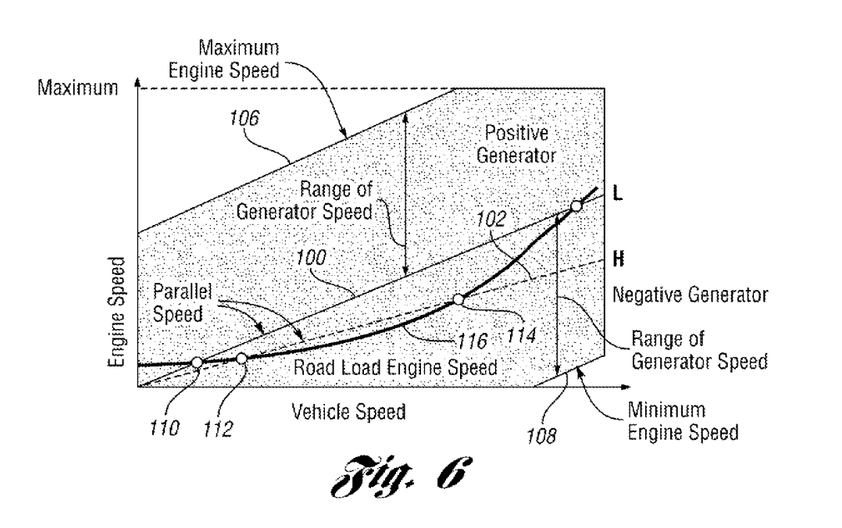
FIG. 6 is a plot of engine speed, vehicle speed and generator speed for the low and high ranges of the system of FIG. 3.

In FIG. 6, the relationship between vehicle speed and engine speed in the parallel mode with the transmission in the low range (L) is a linear relationship as shown at 100 in FIG. 6. If the transmission is shifted to the high range (H), the relationship between vehicle speed and engine speed in parallel mode is shown at 102. The engine speeds that are most efficient for a given road load are shown at 116. Maximum engine speed is shown at 106 and minimum engine speed is shown at 108. The range of generator speed will vary from zero in parallel mode to a value corresponding to either a maximum engine speed or a minimum engine speed, as indicated in FIG. 6.

It is seen in FIG. 6 that when the transmission is operating in the parallel mode, the engine speed, as the vehicle speed increases, is closer to the most efficient road load engine speed. The linear parallel speed plot for high range operation intersects the road load engine speed plot at three intersection points. The corresponding plot for low range operation, shown at 100, is displaced from the road load engine speed line and intersects that line at only one usable intersection point, as indicated at 110. The usable intersection points for high range operation are shown at 112 and 114. At these points 112 and 114, full engine power is transferred through the mechanical path. The transmission still can work in a negative split mode, but the detrimental effect of inefficiency due to operation in the negative split mode is substantially reduced. Further, the amount of electrical power is reduced compared to a transmission of the type disclosed in FIG. 1. The entire powertrain thus can be operated at a higher efficiency. If the gear ratio of the high range is designed in such a way that the straight line 102 is tangent to curve 116, points 112 and 114 will merge to one point and the system has no negative split. This substantially improves overall powertrain efficiency. But the design of gear ratios is also constrained by vehicle acceleration requirements, so the design may need to compromise efficiency or performance by arbitrating between the two.

The powertrain system seen in FIG. 3 can operate in the series mode if the ring gear is locked by moving the synchronizer clutch 96 to the right. This prevents rotational movement of the ring gear 22' so that engine power output can be transferred only through the electrical path.

A mechanical reverse drive is obtained by shifting synchronizer clutch 96 to the left. The mechanical reverse thus is effected by using engine power. It is not necessary to rely upon motor power for reverse driving power as in the case of the powertrain seen in FIG. 1.

There is a mechanical neutral mode if the gear selectors are not in an engaged state.

During shifting from one ratio to another, the clutch C1 seen in FIG. 3, will be disengaged when the driver "tips out" from a high power command. There will be no engine torque nor generator torque demand at this instant. Engine fuel consumption would be minimal since engine torque would be needed only to compensate for system friction. At this moment, synchronizer clutch 92 can be switched to the high gear position. After the synchronizer clutch 92 is shifted, the ring gear speed should be synchronized with the speed of countershaft 70. The ratio shift is completed when clutch C1 is re-engaged.

The operation of clutch C2 is similar to the operation of clutch C1. The vehicle may start in low gear using a motor torque path. This fully utilizes the motor low speed torque and maximum power. As the motor reaches a speed at which its torque begins to decrease, its efficiency will decrease. At that instant, clutch C2 in FIG. 3 will be disengaged and the synchronizer clutch 94 will be shifted to its high range, thereby lowering the motor speed and allow the motor to enter its most efficient operating range. In either of these range transitions, the other torque path will continue to operate so that the torque delivered to the final drive 68 will be continuous.

The engine can be started by using generator power when the engine torque path is locked using the clutch 96. This eliminates the need for motor torque to hold the ring gear during the engine starting process.

Overall vehicle powertrain efficiency is determined by engine efficiency and efficiency of the other elements of the powertrain. In a conventional powertrain with an internal combustion engine and a mechanical multiple-speed transmission, the transmission has fixed ratios and scheduled shifting between ratios. The engine efficiency, however, cannot be optimized for a given power command since the number of gear ratios is limited. In a powertrain such as that shown in FIG. 1, the e-CVT characteristics of the powertrain uses the generator to regulate engine speed. The engine efficiency, therefore, can always be maximized by the continuously variable ratio feature at a given vehicle speed and for a given engine power request.

Figure 7:
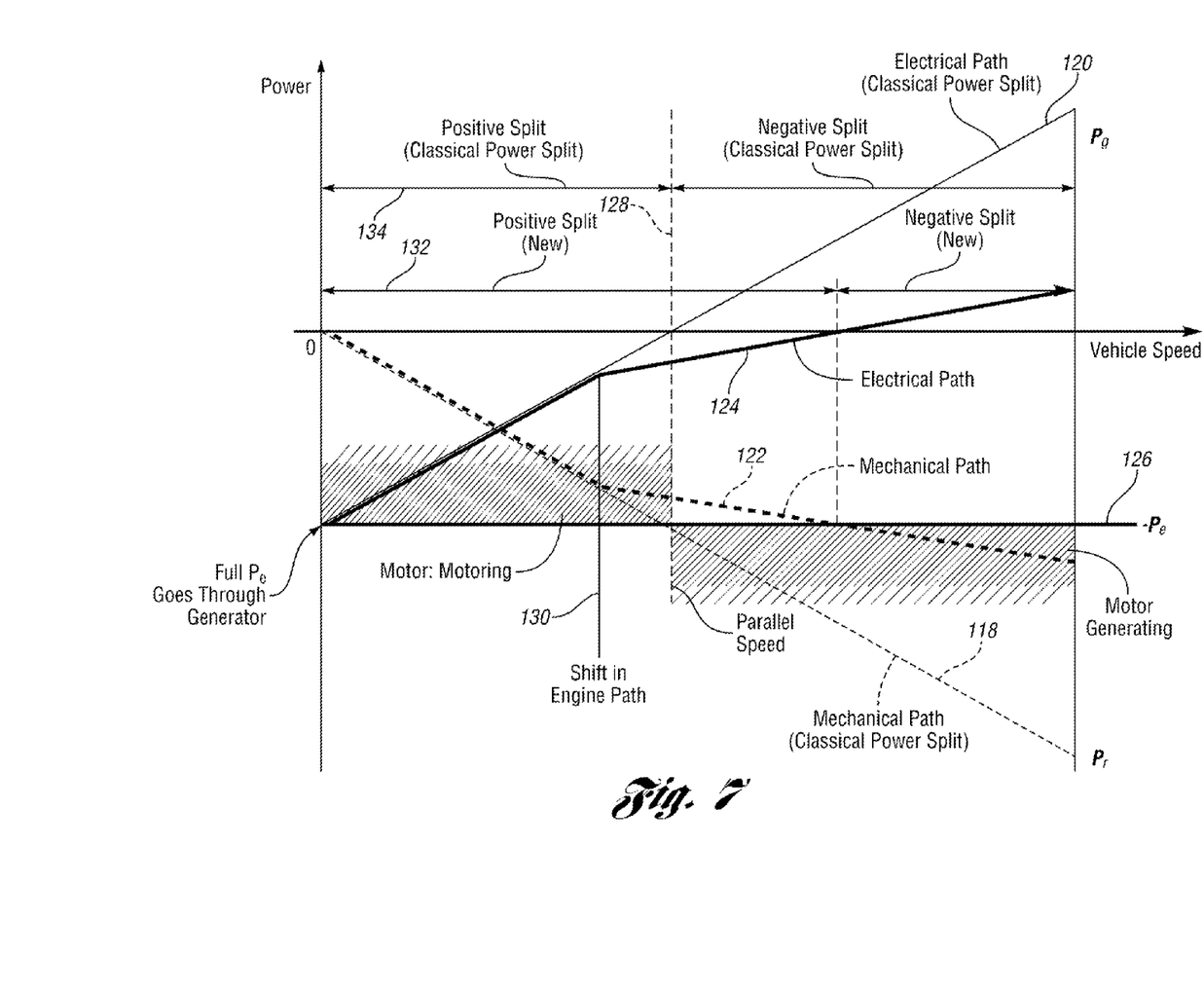
FIG. 7 is a plot of mechanical power and electrical power in the power split configuration of FIG. 3 for a range of vehicle speeds.

In such a power split system, the power is transferred both through a mechanical path from the ring gear and through an electrical path using the generator-motor. As shown in FIG. 7, the power distribution is fixed for a given engine torque and speed. The mechanical path has a higher efficiency than the electrical path, but no more control can be used to change this distribution after the engine speed control target is fulfilled. Therefore, the engine efficiency is high in a conventional power split system, but this feature causes a lowered overall transaxle efficiency compared to a purely mechanical system. In the most ideal case, the engine speed operates most efficiently at a point that corresponds to the transaxle most efficient operating point.

FIG. 6 shows the relationship between vehicle speed and engine speed. Lines 100 and 102 in FIG. 6 represent operation in the low and high modes. The curve 116 for parallel speeds is a plot of optimal engine speeds for a nominal vehicle load at a given vehicle speed. Lines 100 and 102 contain the points at which all power is distributed through the mechanical path, which results in maximum powertrain efficiency. The road load engine speed curve at 116 contains the best engine efficiency points. The smaller discrepancy between the lines representing the mechanical power delivery and the curve 116, the better the system efficiency can be. The best efficiency parallel speeds are the vehicle speeds when the straight lines intersect the curve 116. At the intersections, all of the engine power is transferred through the mechanical power flow path. A conventional power split powertrain of the type shown in FIG. 1 has only one usable parallel speed, so its usage is limited compared to the system of the present invention where two additional usable parallel speeds are present.

FIG. 7 shows an electrical power split between the mechanical power path $P_r$ and through the generator power path $P_g$ seen at 118 and 120, respectively. The lines 122 and 124 represent, respectively, the corresponding plots for ring gear power $P_r$ and generator power $P_g$ for the system of FIG. 3. In the plot of FIG. 7, a fixed engine power with a constant engine brake torque and a constant engine speed is assumed. This is indicated at 126, which carries the legend $P_e$. In the so-called classic one-mode power split powertrain of the type shown in FIG. 1, the following algebraic relationships between speed and power will apply:

$$\omega_g = \frac{1+\rho}{\rho}\omega_e - \frac{\omega_r}{\rho}$$

$$P_g = \tau_g \omega_g = -\left(\tau_e \omega_e - \frac{\tau_e}{1+\rho}T_{d2r}\omega_d\right)$$

$$P_r = \tau_r \omega_r = -\frac{\tau_e}{1+\rho}\omega_r = -\frac{\tau_e}{1+\rho}T_{d2r}\omega_d$$

where ρ is the planetary gear ratio and $\omega_d$ is the wheel speed. $T_{d2r}$ is the gear ratio between the ring gear and the wheels.

These equations show that the ring gear output power $P_r$ and the generator output power $P_g$ are both straight lines in FIG. 7 with respect to wheel speed $\omega_d$. The slopes of these straight lines in FIG. 7 are determined by the planetary gear pitch diameters and the gear ratio between the ring gear to the output shaft. The shaded areas show the motor power in the power split mode and in the negative split mode. The motor can act as a motor to help the engine drive the vehicle or it can act as a generator to charge the battery in each mode. In a typical case, the motor operates as a motor in the positive split mode and as a generator in the negative split mode.

When the vehicle speed is near zero, all the engine power goes through the generator. No mechanical power output is delivered to the ring gear. At a certain vehicle speed, which is indicated as a parallel speed in FIG. 7, all the engine power goes through the mechanical path. The generator output is zero at this time.

The power split powertrain is in the positive mode below the parallel speed and is in the negative split mode above the parallel speed. When the operating point illustrated in FIG. 7 is to the left of reference line 128, the powertrain is in a positive split mode. When the operating point is to the right of reference line 128, the powertrain operates in a negative split mode. A high electrical power delivery in the negative split mode is not desired due to the lower efficiency previously described. The system has its best efficiency when the powertrain operating point is close to the parallel speed lines seen in FIG. 6.

The generator power and the ring gear power in the multiple-mode power split powertrain of the invention can be expressed by the following flexible algebraic equations:

$$P_g = \tau_g \omega_g = -\left(\tau_e \omega_e - \frac{\tau_e}{1+\rho} T_{d2r\_L} \omega_d\right)$$

or $$P_g = \tau_g \omega_g = -\left(\tau_e \omega_e - \frac{\tau_e}{1+\rho} T_{d2r\_H} \omega_d\right)$$

$$P_r = \tau_r \omega_r = -\frac{\tau_e}{1+\rho} \omega_r = -\frac{\tau_e}{1+\rho} T_{d2r\_L} \omega_d$$

or $$P_r = \tau_r \omega_r = -\frac{\tau_e}{1+\rho} \omega_r = -\frac{\tau_e}{1+\rho} T_{d2r\_H} \omega_d$$

In FIG. 7, the above equations are represented by linear plots 122 and 124. The slopes change when a shift is made as indicated at 130. Because of this shift, the positive split mode is extended and the power circulation associated with a negative split mode is reduced. The extension of the positive split mode is apparent by comparing lines 132 and 134. Thus, the engine best efficiency point can better match the transaxle overall efficiency point.

Because of the two ratios that are available with the powertrain indicated in FIG. 3, the generator speed can be reduced due to the ratio change so that the electrical loss for the power electronics is decreased. The transmission can use a generator with the same maximum torque, but with a smaller power rating. A plot of generator torque versus generator speed and the effect of a lower generator current are indicated in FIG. 8. The system of FIG. 3 makes possible lower generator power. By using shift control for the low and high modes, the generator speed can be reduced from point 142 in a classical one-mode power split design, to 136 in the design of the present invention. Typically, generator torque decreases at high generator speeds, as shown at 140.

Figure 9:
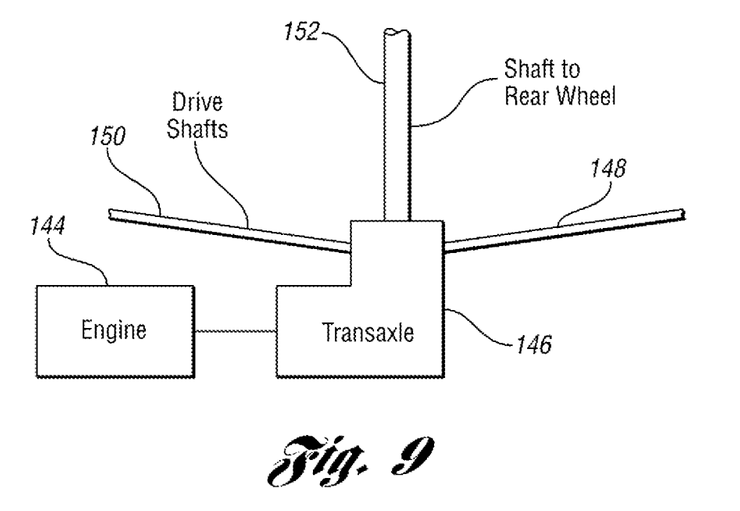
FIG. 9 is a schematic representation of a vehicle packaging arrangement of the elements of a powertrain incorporating the features of FIG. 3.

FIG. 9 shows the general relationship of the components of a hybrid vehicle powertrain that has rear wheel drive capability. The engine 144 and a transmission (transaxle) 146 may deliver driving torque to two axle half-shafts as shown at 148 and 150. The transaxle can be arranged with a differential gear system that will deliver torque to driveshaft 152, which extends to the rear vehicle driving axle and differential. A separate electric machine at the rear axle is not needed to accomplish all wheel drive.

Although an embodiment of the invention has been disclosed, modifications may be made by persons skilled in the art without departing from the scope of the invention. All such modifications and equivalents thereof are intended to be defined by the following claims.

What is claimed:

1. A hybrid electric vehicle powertrain with split power delivery characteristics comprising an engine, a generator, a motor, a battery and gearing for delivering engine power in a mechanical power delivery path and in an electro-mechanical power delivery path;
    a multiple-ratio gear system; and
    a plurality of clutches selectively connecting a torque output element of the gearing and the motor to the gear system whereby duration of operation in a negative split mode is reduced.

2. The powertrain set forth in claim 1 wherein the multiple-ratio gear system includes a reverse gear arrangement whereby reverse driving torque may be delivered to a power output shaft.

3. The powertrain set forth in claim 1 wherein the multiple ratio gear system includes a brake for holding the torque output element of the gearing thereby establishing a series drive mode as the engine drives the generator to charge the battery for powering the motor.

4. A hybrid electric vehicle powertrain comprising an engine, a generator, a battery and a split power gear unit, the gear unit comprising a torque input element driven by the engine, and a torque output element, the generator being connected to an engine torque reaction element of the gear unit;
    a motor electrically coupled to the generator and the battery;
    a multiple-ratio gear system;
    a first clutch for connecting a first torque input shaft of the multiple-ratio gear system to the torque output element of the gear unit;
    a second clutch for connecting a second torque input shaft of the multiple-ratio gear system to the motor;
    the multiple-ratio gear system being adapted for operation in a high speed ratio range and in a low speed ratio range as torque is delivered to a driven shaft from the split power gear unit and from the motor, respectively, through the first and second clutches.

5. The hybrid electric vehicle powertrain set forth in claim 4 wherein the multiple-ratio gear system comprises reverse ratio gear elements for reversing direction of rotary motion of torque delivery to the torque output shaft of the gear system.

6. The hybrid electric vehicle powertrain set forth in claim 4 wherein the split power gear unit is adapted for operation in a positive split power delivery mode in a first range of vehicle speeds and in a negative split power delivery mode in a second range of vehicle speeds, the first vehicle speed range being longer than the second vehicle speed range during a driving event whereby overall powertrain power delivery efficiency is improved.

7. The hybrid electric vehicle powertrain set forth in claim 5 wherein the split power gear unit is adapted for operation in a positive split power delivery mode in a first range of vehicle speeds and in a negative split power delivery mode in a second range of vehicle speeds, the first vehicle speed range being longer than the second vehicle speed during a driving event whereby overall powertrain power delivery efficiency is improved.

8. The powertrain set forth in claim 1 wherein the multiple-ratio gear system includes a mainshaft connected to a torque output shaft, a pair of countershafts, high and low range gear elements on each countershaft;

torque output gear elements on the mainshaft connected drivably to the mainshaft, one mainshaft gear element being a reverse drive gear element;

the plurality of clutches comprising a first clutch connecting a torque output element of the gearing to one countershaft and a second clutch for connecting the motor to another countershaft.

9. The powertrain set forth in claim 4 wherein the multiple-ratio gear system includes a mainshaft connected to a torque output shaft, a pair of countershafts, high and low range gear elements on each countershaft;

torque output gear elements on the mainshaft connected drivably to the mainshaft, one mainshaft gear element being a reverse drive gear element;

the first clutch connecting a torque output element of the gear unit to one countershaft and the second clutch connecting the motor to another countershaft.

10. The powertrain set forth in claim 1 wherein the powertrain is adapted for operation in a positive split mode for a first range of vehicle speeds and in a negative split mode during operation in a second range of vehicle speeds, the first range being greater than the second range whereby overall powertrain power delivery efficiency is improved.

11. The powertrain set forth in claim 8 wherein the powertrain is adapted for operation in a positive split mode for a first range of vehicle speeds and in a negative split mode during operation in a second range of vehicle speeds, the first range being greater than the second range whereby overall powertrain power delivery efficiency is improved.

12. The powertrain set forth in claim 4 wherein the multiple-ratio gear system includes a brake for anchoring the reaction element of the gear unit whereby the powertrain may operate in a series configuration as the engine drives the generator to drive the motor.

13. The powertrain set forth in claim 4 wherein the generator is adapted to act as an engine starter motor.

14. The powertrain set forth in claim 1 wherein the multiple-ratio gear system includes a brake for anchoring a reaction element of the gearing whereby the engine may be started using the generator as a starter motor.

* * * * *